Jan. 17, 1961  A. E. STONE  2,968,471
AUTOMOBILE AIR CONDITIONING CONTROL APPARATUS
Filed March 31, 1958
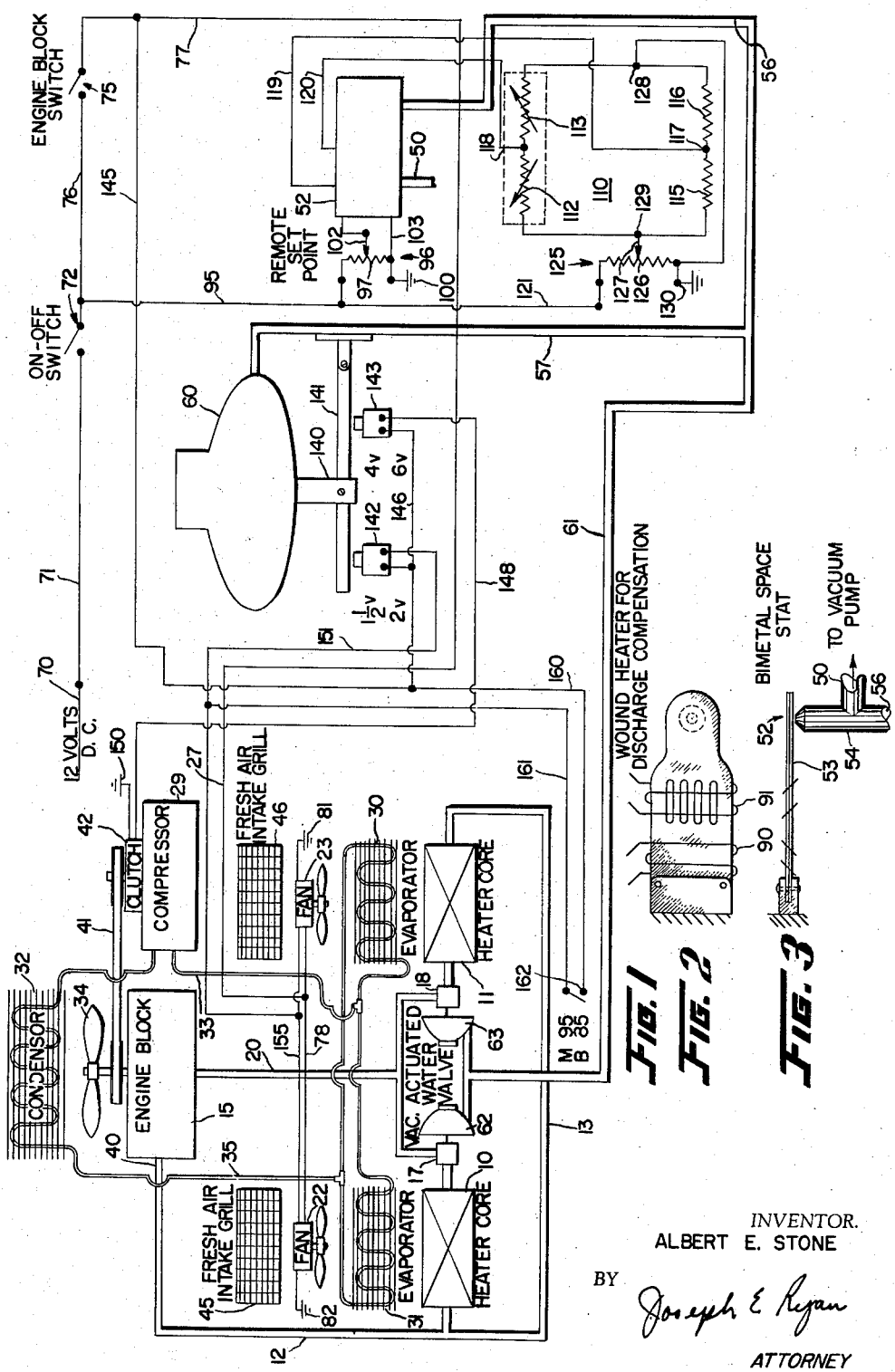
INVENTOR.
ALBERT E. STONE
BY Joseph E. Ryan
ATTORNEY

United States Patent Office 2,968,471
Patented Jan. 17, 1961

2,968,471

AUTOMOBILE AIR CONDITIONING CONTROL APPARATUS

Albert E. Stone, Western Springs, Ill., assignor to Minneapolis-Honeywell Regulator Company, Minneapolis, Minn., a corporation of Delaware Filed Mar. 31, 1958, Ser. No. 725,225

8 Claims. (Cl. 257—287)

My invention relates to air conditioning apparatus, more particularly to an improved type of automotive space type air conditioning apparatus.

Temperature control systems of this type are known but at the present time are mechanically operated or partially automatic with a high degree of complexity in control. The present invention is directed to a simplified automotive air temperature air conditioning system which includes a simplified control apparatus. Therefore, it is an object of this invention to provide an improved automotive air conditioning apparatus. It is further an object to this invention to provide an improved control apparatus for an automotive air conditioning system which automatically controls heating and cooling without manual operation. It is further an object of this invention to provide in a control apparatus of this type a simple bi-metal operated pilot valve responsive to air discharge in the space to be air conditioned which will control pressure in a pair of actuators to operate selectively in the control of heating and cooling of the space to be conditioned. A further object of this invention is to provide an improved control apparatus for an automotive air conditioning system including means for compensating for temperature changes caused by accelerations of the automobile. A still further object of this invention is to provide a simplified control of vacuum operated controllers for an automotive air conditioning system.

These and other objects of this invention will become apparent from the reading of the attached description together with a drawing wherein:

Figure 1 is a schematic disclosure of my improved automotive temperature air conditioning control apparatus;

Figure 2 is a plan view of a portion of a primary sensor in my improved automotive air conditioning control apparatus; and Figure 3 is a side elevation view of a sensor shown in Figure 2.

My improved automobile air conditioning apparatus as shown schematically in Figure 1 is an improved arrangement for tempering circulated air to be supplied to a space such as an interior of an automobile or bus or similar vehicle. The air conditioning apparatus includes as a source of heat a heater core supplied with hot water from the engine block of the cooling system of the automobile engine. A pair of heater cores are shown herein at 10 and 11 respectively which are connected through a conduit or piping indicated at 12 and 13 to the engine block indicated schematically at 15. Return lines from the heater cores 10 and 11 include valves 17 and 18 shown schematically therein which are connected to a common return duct 20 leading back to the engine block. It is assumed although not shown, that some type of circulating means will be included in the engine block for circulating the heating medium and that suitable radiator type apparatus (not shown) will also be included. The heater cores, as in conventional practice, will be located within the interior of the space to be air conditioned, such as the interior of a car or bus. Associated with the cores are fans indicated at 22, 23 which circulate air across the heater core and to the interior of the space.

Cooling of the air to be circulated to the space is provided with a conventional cooling system including a compressor 29, evaporators 30, 31 and the condenser 32, the coolant from the compressor flowing through a line 33 to the evaporators 30, 31 and from the evaporators through a return line 35 to the condenser 32 and back to the compressor. The evaporators are adapted to be positioned in the same or a similar location to the location of the heater cores 10 and 11, that is, either in or adjacent to the space to be conditioned and in front of the fans 22, 23 such that the air may be circulated over the same to temper the circulated air. The condenser as indicated in Figure 1 would normally be positioned adjacent the engine fan indicated at 34 adjacent with the engine radiators so that it will be cooled and condense the coolant. The compressor 29 is shown as being driven from a shaft, such as the engine drive shaft through a pulley 40 associated therewithin and a belt 41 to a clutch mechanism indicated at 42 which couples the engine shaft drive with the compressor for operation of the same. Clutch 42, shown in block form, may be of a conventional friction clutch type which is electrically operated through a control circuit to be later defined. Also included with the air circulation system are intake grills or fresh air intakes, such as are indicated by the grills 45, 46, through which outside air is introduced to the control system to be circulated by the fans 22, 23. The valving or dampering associated with these air intakes (not shown) form no part of this invention and would normally be manually operated. Fans 22, 23, shown schematically in Figure 1, are of the two speed type having individual electric circuits for control of the same. While the present disclosure shows a pair of fans, evaporator and heater cores, it will be recognized any number can be used for this purpose.

Control of the flow of hot water to the heater cores and energization of the clutch to connect the compressor to the engine drive shaft is effected through a simplified control system to be hereinafter identified. The basic working medium for the control circuit is obtained from the vacuum line of the automobile through a pump (not shown) operated from the engine block. A vacuum source as indicated at 50, is connected through a simplified valve mechanism indicated in block at 52 in Figure 1. The valve mechanism 52 is shown as a bi-metal blade 53 cooperating with a nozzle 54 in Figures 2 and 3 to control the vacuum supply to a vacuum line or pipe indicated at 56 leading to a line 57 connected to a vacuum operator indicated generally at 60 and a second vacuum line 61 connected to a pair of vacuum operators 62, 63 associated with and operating the valves 17 and 18 in the hot water line. The valve formed by the bi-metal 53 and nozzle 54 operates to modulate the vacuum pressure from the source to vary the pressure applied to the operator 60 and valve operator 62, 63 such that the operator 60 may be operated from one range of vacuum pressures and the vacuum operators 62, 63 connected to the valves 17 and 18 may be operated for a second range of vacuum pressure. The nozzle 54 as indicated in Figure 3 is connected to the vacuum source indicated merely by the pipes 50 and to the pipe 56 leading to the pipes 61 and 57 for the operators. The bi-metal flapper and the nozzle form a bi-metal space stat which would normally be positioned at the discharge point of the circulated air across the evaporator and heater cores to the space to be conditioned and there would sense circulated air to determine the temperature requirements of the space to be conditioned. With the present control apparatus, the fans 22, 23 are normally operated continuously on the low speed side whenever the control apparatus is in operation. The electrical circuit for the fans lead from a source indicated as a 12 volt D.C. source by the numeral 70 through a conductor 71 to an on-off control switch 72. The on-off control switch is connected to an engine block switch indicated at 75 which is associated with and responds to the temperature of the engine block. A conductor 76 connects the switch 72 to the switch 75 and a conductor 77 from switch 75 leads to the low speed fan connections indicated by the conductors 78 with the fans being grounded as at 81 and 82 respectively. The engine block switch in this electrical circuit prevents fan operation after the initiating switch 72 has been set to "on" until the engine block comes to a desired operating range such as for example about 90° F. The control valve 52 formed of the bi-metal 53 and nozzle 54 has associated therewith two setting and compensating means in the form of a pair of heaters indicated at 90, 91 respectively, the heaters being wound on the bi-metal 53 in heat exchange relation thereto and designed to heat the bi-metal such that it will be displaced away from the nozzle 54. The bi-metal is so positioned relative to the nozzle that upon a rise in temperature, it will be deflected away from the nozzle and toward the nozzle upon a fall in temperature. The heater 90 is designated as a setting control and is energized from the electrical circuit including the source 70, conductor 71 and switch 72 to a conductor 95 leading to a setting potentiometer 96 formed of a winding 97 connected at one extremity to the conductor 95 and grounded as at 100 at the other extremity. The potentiometer 96 has a wiper 102 connected to one extremity of setting winding 90 and the other extremity of the heater winding is connected through a conductor 103 to the ground connection 100. By adjusting the position of the wiper 102 relative to the winding 107, the applied potential from the source 70 may be varied to vary the amount of current to the heater 90 and hence the heat output from the same to position the bi-metal 53 relative to the nozzle for a normal or setting position.

The heater 91 is energized from a rate of discharge stat indicated herein as a bridge circuit 110 comprised of two variable resistors or thermistors having different time constants, 112, 113 or it may include instead of thermistors lagged and unlagged resistance bulbs. The thermistors or variable temperature responsive resistors form two legs of the bridge which is completed by fixed resistors 115, 116 with output terminals 117, 118 of the bridge circuit being connected through conductors 119, 120 to the extremities of the winding 91. The energization of the rate of discharge stat 110 is obtained from the source 70 and through conductor 71, switch 72, conductor 95 and a conductor 121 to a calibrating potentiometer or authority potentiometer 125 composed of a winding 126 and a wiper 127, the winding 126 being connected at one extremity to the conductor 121 and grounded at the other extremity as at 130. The ground connection 130 and the wiper 122 are connected across the input diagonals to the bridge or to input terminals 128, 129 respectively. By adjusting the wiper 127 of the potentiometer 125 relative to the winding 126, the level of energization of the bridge may be varied to vary the output therefrom for a given bridge unbalance. The bridge unbalance is obtained by a variation in resistance between the elements 113, 112 which as previously indicated have different time constants or are lagged and unlagged. The rate of discharge stat is adapted to be positioned in the outlet of the circulated air from the evaporators and heater cores or the inlet to the space such as to be effected by the temperature of the air supplied to the space. Upon a rapid increase or decrease in temperature of the air, the rate of discharge stat 110 will become unbalanced energizing the heater 91 to deflect the bi-metal 53 from the nozzle 54 and vary the vacuum pressure to the operators.

The range of vacuum pressure in the lines 56, 57 and 61 to the operators 60, 62 and 63 varies in accordance with the position of the valve 52. For purposes of explanation, it will be assumed that zero inches of vacuum corresponds to atmospheric pressure and that the vacuum operated water valves or the operators for the valves 17 and 18 will operate from the 5 inch vacuum for fully closed valve position to a 10 inch vacuum for fully opened valve position. Vacuum pressure is built up in the lines, that is the air pressure in the lines is reduced below atmospheric pressure, up to a vacuum pressure of 5 inches vacuum and the water valves will remain closed. As the 5 inch pressure is exceeded up to 10 inch vacuum pressure, the valve will open proportional to the vacuum pressure with a modulating type action. At all pressures above 10 inches vacuum, the valves will remain in a fully opened position. With a call for heat, the bi-metal 53 will be urged toward the nozzle 54 to prevent air leakage into the vacuum system and allowing the vacuum pump to have a greater effect on the lines 56, 57 and 61 to increase the vacuum pressure therein. The range of operation between the water valves and the cooling apparatus shown herein as the compressor, evaporator and condenser lies below the 5 inch vacuum pressure for the closed position of the water valves as will be later explained. The cooling apparatus, that is the compressor 29, evaporators 30, 31 and condenser 32 are powered from rotation of the engine drive shaft through the pulley and belt drive 40, 41 and clutch 42 for selective on-off type operation. The vacuum operator 60 shown schematically herein responds to a range of pressure to move its output shaft 140 which is connected through a pivoted linkage 141 to engage a pair of switches indicated at 142, 143 respectively. The range of operation of this actuator is best defined by the make and break conditions of the respective switches which are provided with varying degrees of over travel to permit such operation. The switch 142 will make at 1½ inches of vacuum pressure on the operator 60 and will break at 2 inches of vacuum pressure while the switch 143 will make at 4 inches of vacuum pressure and will break at 6 inches of vacuum pressure. The switch 143 is adapted to connect the clutch 42 to the 12 volt electrical supply 70 through a circuit including conductor 71, switch 72, conductor 76, engine block switch 75, conductor 77 to a conductor 145, conductor 146, switch 143, conductor 148 to clutch 42 with the circuit being completed through a ground connection 150. Thus, to energize the clutch, the on-off switch must be in an engaged position and the engine block switch must be closed, indicating an engine block temperature of at least 90° F. and the vacuum pressure controlled by the primary controller or stat 52 to the operator 60 must have reached a range of 4 inches vacuum. The increase in the vacuum pressure beyond 6 inches of vacuum will cause the switch to break. The switch 142 which controls the high speed fan circuit on the cooling cycle of the temperature control system or apparatus is energized similarly from the source 70 through conductor 71, switch 72, conductor 76, switch 75, conductor 145, switch 142, conductor 151 to conductor 155 leading to the high speed terminals of the fans 22, 23 with the circuit being completed through the ground connections 81, 82 for the fans.

In addition to switch 142, the high speed fan circuit is also controlled on a heating side from the source of power through a circuit including the source 70, conductor 71, switch 72, conductor 76, switch 75, conductor 145 to conductor 160; a space stat or switch 162 positioned adjacent the outlet or air stream across the heater cores 10 and 11, conductor 161 to conductor 151 leading to the high speed fan terminals 155 for fans 22, 23 to the ground connections 81, 82. The stat 162 is designed to make, for example, at a 95° F. temperature or air temperature from the heater core to give a final stage of heating and breaks at a temperature of 85° F. This circuit is independent of the switch 142 and operates on the heating cycle for the air conditioning control apparatus.

The operation of the improved air conditioning control apparatus is to a degree conventional in that with this apparatus the heating means, that is the hot water through the heater core and the cooling means, that is the refrigeration system, with air circulated across the exchangers will be operative to maintain circulated air temperature within the automotive space such as the interior of the car or bus in accordance with a set point temperature. Variation of the temperature above the set point will tend to cause operation of the cooling system and variation below the set point will operate the heating system to maintain or return the circulated air to the desired temperature. The fan system operates normally on low speed whenever the engine of the automotive apparatus has reached a normal operating range and the engine block switch setting up the circuit for low speed fan operation is closed. The air conditioning system is initiated through the on-off switch 72 moved to the "on" position which sets up the electrical circuit for the heaters on the valve or the bi-metal portion of the valve and the low speed fan circuit. At the outset of operation, the setting potentiometer 102 is adjusted such that sufficient heat will be supplied to the bi-metal which responds to trace temperature or discharge air temperature to the space to move the bi-metal to a position relative to the nozzle where a predetermined vacuum pressure is applied to the lines 56, 57, 61. The energization of the stat 110 through the adjustable potentiometer 125 will not initiate energization of the heater 91 until the bridge type stat becomes unbalanced. This will take place only with rapid changes in temperature causing the thermistors or variable resistor elements 112, 113 which have different time constants to be effective to unbalance the bridge for energization of heater 91. Vacuum line pressure from the engine will be established before the engine reaches a normal operating temperature such that the control apparatus will be in a position to operate the valve means 17 and 18 and switch means 143 when the circuit is energized. Variation in the ambient temperature surrounding the space, variation in the number of persons within the space and the introduction of fresh air from the grills 45, 46 all have the effect of varying the requirements on the heat exchangers to bring the space to a desired temperature level. The flapper or bi-metal 53 will have a mean or normal position for the setting position of the potentiometer 102 to provide a vacuum pressure in the lines which will not open the valves 17 and 18 and will not cause the clutch 42 to be engaged operating the cooling system. This will normally lie in the range between 4 and 5 inches vacuum pressure. Upon a demand for heat in this space, that is when the space temperature or circulated air temperature drops below the setting for the stat, the bi-metal will be moved toward the nozzle to increase vacuum pressure above the normal or predetermined neutral operating pressure. As the vacuum pressure increases in the line 61 above 5 inches vacuum, the water valves 17 and 18 will begin to open allowing circulation of the cooling water from the engine block to the heater cores across which the fans 22, 23 are circulating the air to raise the temperature in the space being conditioned. Continued demand in the form of a displacement of a bi-metal 53 toward the nozzle raises the vacuum line pressure causing the valves 17 and 18 to open to their full position which is reached at 10 inch vacuum on the actuator 62, 63. The rise in temperature of the heater cores will operate the stat 162 when an ambient temperature at the core reaches 95° F. setting up an energization circuit for the high speed operation of the fans 22, 23 through the circuit outlined above. High speed fan operation will continue once initiated until the temperature has dropped below 85° F. giving maximum heat output from the heater cores. In the case of acceleration of the automotive engine causing a rapid circulation of water or the heating medium through the heater cores 10 and 11, a surge of space temperature will result from the air circulated by the fans over the heater cores. The stat 110 is positioned adjacent the heater cores or in the path of the circulated air to the space so that it will respond to these temperature surges with an unbalancing of bridge circuit to energize the heater 91 displacing the bi-metal 53 away from the nozzle 54 and reducing the vacuum pressure in line 61 to close the valves or move the valves toward a closed position. This rate stat is sufficiently fast in response on the bi-metal 53 to compensate for such temperature surges caused by engine operation such that the air temperature within the space being conditioned will not be varied extremely.

On the cooling side of the operating cycle, whenever the space temperature rises to a point where the bi-metal 53 of the space stat is displaced from the nozzle 54, the pressure in the lines 56, 57, 61 drops to a point where the valves 17, 18 remain in a closed position and the operator 60 is effective to engage the switch 143 with the vacuum pressure on the line of 4 inches vacuum. Engagement of the switch 143 to make the switch will set up an energizing circuit for the clutch causing circulation of the coolant to the evaporators across which the air flow from the fans 22, 23 is directed to cool the space being conditioned. Continued drop in line pressure will not alter the operation of the energization circuit for the clutch since the 4 inch vacuum or less will maintain the switch in an energized position maintaining clutch energization and operation of the compressor and hence circulation of the coolant to the evaporators. As on the heating cycle, the low speed fan circuit is continuously energized when the switch 72 and engine block switch 75 are engaged and with an increased demand for cooling as evidenced by decrease in vacuum pressure in the lines 56, 57 and 61 determined by the stat 52, the switch 142 will be made on the 1½ inch vacuum pressure to engage the high speed fan energization circuit for the fans 22, 23 causing maximum circulation of the cooled air being circulated to the space. The switch 142 will remain energized as vacuum pressure builds up until 2 inches of vacuum is obtained causing a wide range of high speed cooling and the switch 143, when energized or made, will continue the energization circuit for the clutch 42 until the vacuum pressure reaches a 6 inch vacuum at which time the heating cycle will start and the cooling cycle will terminate. As in the heating cycle, fresh air may be introduced to the system through the grills 45, 46 by means of auxiliary apparatus forming no part of this invention. This fresh air may alter the temperature of the circulated air to call for additional operation of the stats 52 and 110 to maintain the set point temperature for the space.

In this control apparatus a simplified automatic change over heating and cooling system is provided for an automotive type device which operates from the vacuum pressure from the engine of the automotive device to effect controlled operation of the heater and cooling apparatus to maintain desired space temperature. The control involved is a simplified apparatus which is accurate and easy to maintain. In considering this invention it should be kept in mind that the present description is intended to be illustrative only and the scope of the invention should be determined by the appended claims.

I claim:

1. An automotive air conditioning control apparatus comprising, a source of heating medium, a heat exchanger, means connecting the source of heating medium to said heat exchanger including valve means, means including an interconnected compressor condenser and evaporator means for supplying a source of cooling medium, clutch means adapted to connect said compressor to a source of motive power to operate said compressor and supply said cooling medium, a first vacuum operator means controlling the operation of said valve means supplying heat to said heat exchanger in proportion to the vacuum applied in the same, a second vacuum operator, a pair of switches operated by said second vacuum operator, circuit means including one of said switches controlling the energization and operation of said clutch means, means including a blower means for circulating air over said heat exchanger and said evaporator means to provide air conditioning through circulation and discharge of conditioned air to an automotive space, circuit means including a second of said switches operated by said second vacuum operator for controlling the energization of said circulating means, a space discharge stat positioned in the discharge of conditioned air to the space and including a bi-metallic blade cooperating with a nozzle, a source of vacuum including conduit means connected to said nozzle, said vacuum operators for said valves and said second vacuum operator, said bi-metallic blade cooperating with said nozzle to vary the magnitude of said vacuum to control said valves and said second vacuum operator, a first heater mounted in heat exchange relationship on said bi-metal, circuit means including an adjustable source of power for controlling the energization of said heater and providing a setting for said stat, a second heater positioned in heat exchange relationship on said bi-metal, and a rate discharge means positioned to respond to said conditioned air and connected to said second heater to control the energization of the same.

2. An automotive air conditioning apparatus for conditioning air in an automotive space comprising, a source of heating medium, a heat exchanger associated with said space and connected to said source of heating medium, valve means included in said connection means for controlling the flow of heating medium to said heat exchanger, a first vacuum operator for operating said valve means, a source of cooling medium, a second heat exchanger, electrically operated control means associated with said source of cooling medium and controlling the amount of cooling medium to be supplied to said second heat exchanger, said second heat exchanger being associated with said automotive space to be conditioned, means including fan means for circulating air across said first and second heat exchangers to and within said space, a second vacuum operator, a source of air pressure, means including a vacuum valve means connecting said source of air pressure to said first and second vacuum operators, said valve means being operative to modulate the pressure to said operators, means connecting said control means of said second vacuum operator to said control means associated with the source of cooling medium to control the same, a bi-metal element forming a part of said vacuum valve means positioned to respond to the air circulating across said heat exchangers to said space, a first heater means associated with said bi-metal and operative to adjust the normal position for said bi-metal, a second heater means associated with said bi-metal and including a rate sensitive means adapted to modify the movement of said bi-metal in response to rate of temperature change of said heat exchangers, said vacuum valve means being effective to control the pressure on said actuators to provide a range of pressure effective to operate one of said vacuum operators for temperatures in said space above a predetermined point and to operate said first named vacuum operator in said valves for temperatures in said space below said predetermined point.

3. An automotive air conditioning apparatus comprising, a heating means, a cooling means, means associating said heating means and said cooling means with a space such that air in said space may be circulated over portions of said heating and cooling means to temper the air and control the temperature in said space, control means operative to control the operation of said heating means, second control means operative to control the operation of said cooling means, a source of vacuum pressure, primary control means connected to the source of vacuum pressure and adapted to modulate said pressure, said control means being positioned in and influenced by the discharge of tempered air from said heating and cooling means to said space, adjustable setting means for adjusting a neutral position for said control means to produce a predetermined vacuum pressure, a first vacuum operator means associated with the control means for said heating means and connected to said primary control means and said vacuum source to operate said control means to vary the effect of said heating means on said tempered air, a second vacuum operator means associated with said second control means for said cooling means and connected to said primary control means said vacuum source to operate said second control means and control the operation of the cooling means, said vacuum operators for said heating and cooling means being operated at different vacuum pressure ranges to either side of said predetermined vacuum pressure range, and a rate discharge means responsive to the rate of change of discharge temperature of the air circulated in said space and operative upon said primary control means to temporarily vary the effect of said adjustable setting means.

4. An automotive air conditioning apparatus comprising, a heating means, a cooling means, means associating said heating means and said cooling means with a space such that air in said space may be circulated over portions of said heating and cooling means to temper the air and control the temperature in said space, control means operative to control the operation of said heating means, second control means opertive to control the operation of said cooling means, a source of vacuum pressure, primary control means connected to the source of vacuum pressure and adapted to modulate said pressure, said control means being positioned in and influenced by the discharge of tempered air from said heating and cooling means to said space, adjustable setting means for adjusting a neutral position for said control means to produce a predetermined vacuum pressure, a first vacuum operator means associated with the control means for said heating means and connected to said primary control means and said vacuum source to operate said control means to vary the effect of said heating means on said tempered air, a second vacuum operator means associated with said second control means for said cooling means and connected to said primary control means and said vacuum source to operate said second control means and control the operation of the cooling means, said vacuum operators for said heating and cooling means being operated at different vacuum pressure ranges to either side of said predetermined vacuum pressure range, a rate discharge means responsive to the rate of charge of discharge temperature of the air circulated in said space and operative to control temporarily the operation of said primary control means, and fan means for circulating air to said heating and cooling means and controlled conjointly by said second vacuum operator means and means responsive to the temperature of said heating means.

5. An automotive air conditioning apparatus comprising, a heating means, a cooling means, means associating said heating means and said cooling means with a space such that air in said space may be circulated over portions of said heating and cooling means to temper the air and control the temperature in said space, control means operative to control the operation of said heating means, second control means operative to control the operation of said cooling means, a source of vacuum pressure, primary control means connected to the source of vacuum pressure and adapted to modulate said pressure, said control means being positioned in and influenced by the discharge of tempered air from said heating and cooling means to said space, adjustable setting means for adjusting a neutral position for said control means to produce a predetermined vacuum pressure, a first vacuum operator means associated with the control means for said heating means and connected to said primary control means and said vacuum source to operate said control means and vary the effect of said heating means and said tempered air, a second vacuum operator means associated with said second control means for said cooling means and connected to said control means and said vacuum source to operate said second control means to control the operation of the cooling means, said vacuum operators for said heating and cooling means being operated at different vacuum pressure ranges to either side of said predetermined vacuum pressure range, and a rate discharge means responsive to the rate of change of discharge temperature of the air circulated in said space, said primary control means comprising a bi-metal flapper cooperating with a nozzle and having a first heater thereon controlled by said adjustable setting means and a second heater thereon controllably energized from said rate of discharge means.

6. An automotive air conditioning control apparatus comprising, heating and cooling means positioned to provide tempered air flow to the space to be conditioned, first and second control means operative to control the operation of said heating and cooling means, first and second vacuum operator means connected respectively to said first and second control means for operating the same, a source of vacuum pressure connected to said vacuum operators and adapted to be modulated such that one of said vacuum operators operates over a predetermined vacuum pressure range and the second vacuum operator operates over a second vacuum range, valve means included in the connection between said source of vacuum pressure and said vacuum operators to modulate the vacuum pressure over said ranges of vacuum pressure, a circulating means for said heating and cooling means directing circulated air from said space over said heating and cooling means to temper the same supplied to said space, a space discharge stat including a bi-metallic blade cooperating with a nozzle in said vacuum line and forming said valve means to vary the vacuum pressure, said space discharge stat being positioned in the path of circulated air from said heating and cooling means, a first heater mounted in heat exchange relationship on said bi-metal, electrical current adjusting means controllably energizing said first heater means from a source of electrical power, a second heater positioned in heat exchange relationship on said bi-metal and connected to the source of power, and a rate of temperature change responsive means connecting said second heater to said source of power and controlling energization of the same, said rate responsive means being positioned to respond to the rate of temperature change of said heating and cooling means.

7. An automotive air conditioning control apparatus comprising, heating and cooling means positioned to provide tempered air flow to the space to be conditioned, first and second control means operative to control the operation of said heating and cooling means, first and second vacuum operator means connected respectively to said first and second control means for operating the same, a source of vacuum pressure connected to said vacuum operators and adapted to be modulated such that one of said vacuum operators operates over a predetermined vacuum pressure range and the second vacuum operator operates over a second vacuum range, valve means included in the connection between said source of vacuum pressure and said vacuum operators to modulate the vacuum pressure over said ranges of vacuum pressure, a circulating means for said heating and cooling means directing circulated air from said space over said heating and cooling means to temper the same supplied to said space, a space discharge stat including a bi-metallic blade cooperating with a nozzle in said vacuum line and forming said valve means to vary the vacuum pressure, said space discharge stat being positioned in the path of circulated air from said heating and cooling means, a first heater mounted in heat exchange relationship on said bi-metal, electrical current adjusting means controllably energizing said first heater means from a source of electrical power, a second heater positioned in heat exchange relationship on said bi-metal and connected to the source of power, a rate of temperature change responsive means connecting said second heater to said source of power and controlling energization of the same, said rate responsive means being positioned to respond to rate of temperature change of said heating and cooling means, and circuit means connected to the source of power and said second vacuum operator associated with said cooling means for controlling a high speed range of operation of said circulating means.

8. An automotive air conditioning control apparatus comprising, heating and cooling means positioned to provide tempered air flow to the space to be conditioned, first and second control means operative to control the operation of said heating and cooling means, first and second vacuum operator means connected respectively to said first and second control means for operating the same, a source of vacuum pressure connected to said vacuum operators and adapted to be modulated such that one of said vacuum operators operates over a predetermined vacuum pressure range and the second vacuum operator operates over a second vacuum range, valve means included in the connection between said source of vacuum pressure and said vacuum operators to modulate the vacuum pressure over said ranges of vacuum pressure, a circulating means for said heating and cooling means directing circulated air from said space over said heating and cooling means to temper the same supplied to said space, a space discharge stat including a bi-metallic blade cooperating with a nozzle in said vacuum line and forming said valve means to vary the vacuum pressure, said space discharge stat being positioned in the path of circulated air from said heating and cooling means, a first heater mounted in heat exchange relationship on said bi-metal, electrical current adjusting means controllably energizing said first heater means from a source of electrical power, a second heater positioned in heat exchange relationship on said bi-metal and connected to the source of power, a rate of temperature change responsive means connecting said second heater to said source of power and controlling energization of the same, said rate responsive means being positioned to respond to rate of temperature change of said heating and cooling means, circuit means connected to the source of power and said second vacuum operator associated with said cooling means for controlling a high speed range of operation of said circulating means, and a further temperature operated switch positioned to respond to temperature of said heating means and connecting said circulating means for said high speed operation independent of said second vacuum operator.

References Cited in the file of this patent

UNITED STATES PATENTS

| | | |
|---|---|---|
| 2,069,418 | Otto | Feb. 2, 1937 |
| 2,125,889 | Crump | Aug. 9, 1938 |
| 2,182,449 | Parks et al. | Dec. 5, 1939 |
| 2,246,550 | Stewart et al. | June 24, 1941 |
| 2,282,878 | Newton | May 12, 1942 |
| 2,286,296 | McGrath | June 16, 1942 |
| 2,287,248 | Holmes | June 23, 1942 |
| 2,865,610 | Sparrow | Dec. 23, 1958 |